(12) United States Patent
Wilson et al.

(10) Patent No.: US 8,177,496 B2
(45) Date of Patent: May 15, 2012

(54) TONE NOISE REDUCTION IN TURBOMACHINES

(75) Inventors: Alexander George Wilson, Derby (GB); Rory Douglas Stieger, Derby (GB); Nigel Smith, Derby (GB); John Coupland, Derby (GB)

(73) Assignee: Rolls-Royce PLC, London (GB)

( * ) Notice: Subject to any disclaimer, the term of this patent is extended or adjusted under 35 U.S.C. 154(b) by 1156 days.

(21) Appl. No.: 12/007,828

(22) Filed: Jan. 16, 2008

(65) Prior Publication Data

US 2008/0181769 A1    Jul. 31, 2008

(30) Foreign Application Priority Data

Jan. 31, 2007   (GB) ..................... 0701866.6

(51) Int. Cl.
*F04D 21/00* (2006.01)
(52) U.S. Cl. ..................... 415/181; 416/223 A
(58) Field of Classification Search ............ 416/242, 416/223 A, 223 R; 415/181
See application file for complete search history.

(56) References Cited

U.S. PATENT DOCUMENTS

| | | | |
|---|---|---|---|
| 3,821,999 A * | 7/1974 | Guess et al. ............... | 181/296 |
| 4,012,172 A | 3/1977 | Schwaar et al. | |
| 5,169,288 A | 12/1992 | Gliebe et al. | |
| 6,071,077 A | 6/2000 | Rowlands | |
| 6,328,533 B1 * | 12/2001 | Decker et al. ............. | 416/223 A |
| 6,358,003 B2 | 3/2002 | Schlechtriem | |
| 2003/0012656 A1 | 1/2003 | Cho et al. | |
| 2006/0210395 A1 | 9/2006 | Schuster et al. | |

FOREIGN PATENT DOCUMENTS

| | | |
|---|---|---|
| CA | 2 558 325 A1 | 9/2005 |
| JP | A 2000-87898 | 3/2000 |
| JP | A 2000-161296 | 6/2000 |

OTHER PUBLICATIONS

Prasad et al., "Propagation and Decay of Shock Waves in Turbofan Engine Inlets", *Proceedings of ASME Turbo Expo 2004*, Paper: GT2004-43949, Vienna, Austria, Jun. 14-17, 2004.
Tyler et al., "Axial Flow Compressor Noise Studies", *S.A.E. Trans.*, vol. 70, pp. 309-332 (1962).
Wilson, "A Method for Deriving Tone Noise Information from CFD Calculations on the Aeroengine Fan Stage", *RTO/AVT Symposium*, Paper: MP-79-P-03-Wilson, Manchester, U.K., Oct. 8-11, 2001.
Shahpar, "Padram: Parametric Design and Rapid Meshing System for Turbomachinery Optimisation", *Proceedings of ASME Turbo Expo 2003*, Paper: GT2003-38698, Atlanta, Georgia, USA, Jun. 16-19, 2003.

* cited by examiner

*Primary Examiner* — Richard Edgar
(74) *Attorney, Agent, or Firm* — Oliff & Berridge, PLC

(57) ABSTRACT

A blade for a turbomachine extends in use, in a radial direction relative to the axis of the turbomachine. The turbomachine has at least one operating condition which generates supersonic fluid flow at the blade. The blade is adapted to provide, at the supersonic operating condition, a leading edge sweep angle which varies such that successive radial positions (i) to (iii) along the leading edge are at respective sweep angle turning points. Position (i) is the radially inner and position (iii) the radially outer of the positions. Position (i) is at or radially outward of the 30% span position, where 0% span is the radially innermost point of the leading edge and 100% span is the radially outermost point of the leading edge.

34 Claims, 13 Drawing Sheets

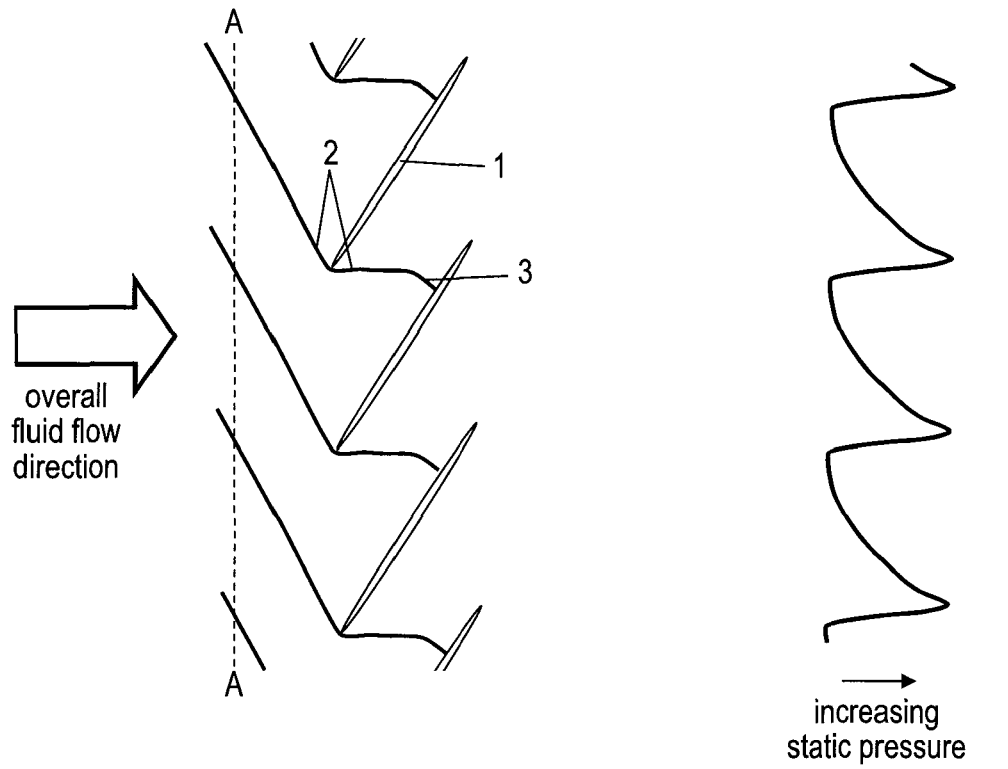
FIG. 1a
FIG. 1b
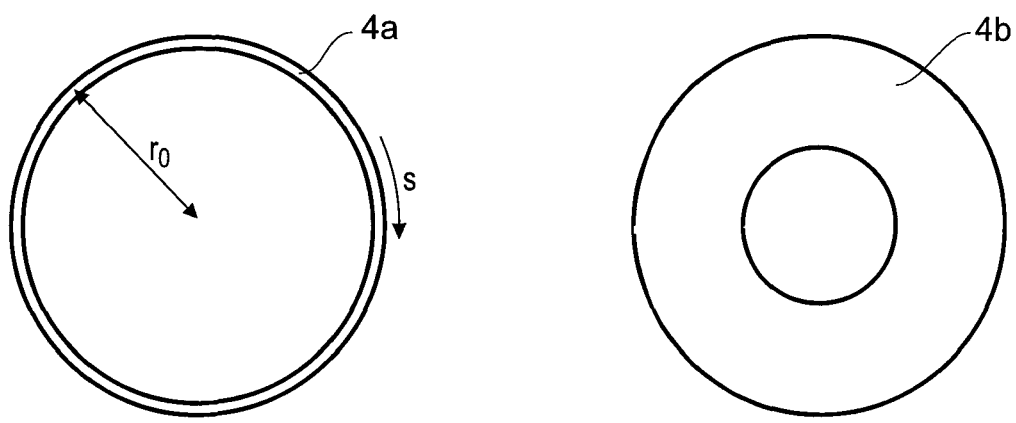
FIG. 2a
FIG. 2b

| | Fixed Parameters | Free Parameters | Total Parameters |
|---|---|---|---|
| R6, X6 | 6: 1# R6=Rcase | 6: 1# X6 | 6: 2# |
| R3, X3, dRdX3 | 3: 3# X3=X2, R3=R2, dXdR3=dXdR2 | 3: 0# | 3: 3# |
| R2, X2, dRdX2 | 2: 1# dRdX2=0? | 2: 3# X2, R2 | 2: 3# |
| R1, X1, dXdR1 | 1: 3#: X1, R1, dXdR1 | 1: 0# | 1: 3# |

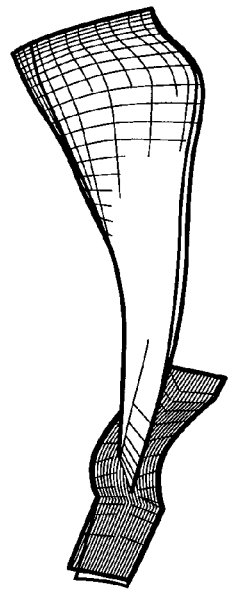

FIG. 11A

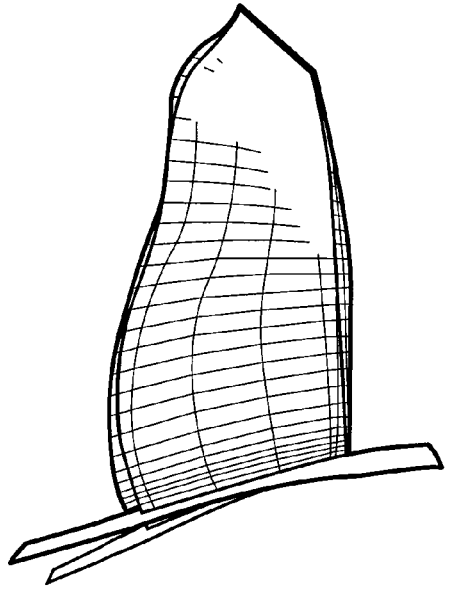

FIG. 11B

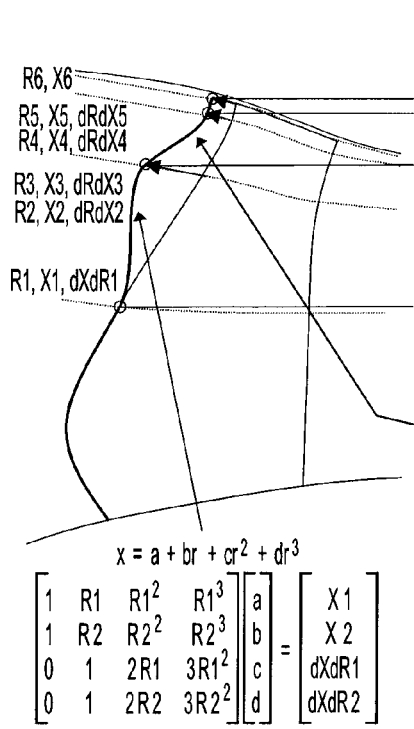

| | Fixed Parameters | Free Parameters | Total Parameters |
|---|---|---|---|
| | 6: 2# R6=Rcase, X6=X5+dXdR4*(R6-R5) | 6: 0# | 6: 2# |
| | 5: 0# | 5: 2# R5, X5 | 5: 2# |
| | 4: 2# R4=R5, dXdR4=0(case normal) | 4: 0# | 4: 3# |
| | 3: 3# X3=X2, R3=R2, dRdR3=dXdR2 | 3: 0# | 3: 3# |
| | 2: 0# | 2: 3# X2, R2, dXdR2 | 2: 3# |
| | 1: 3#: X1=0, R1=0, dXdR1=0 | 1: 0# | 1: 3# |

$$x = e + fr + gr^2 + hr^3$$

$$\begin{bmatrix} 1 & R_3 & R3^2 & R3^3 \\ 1 & R_4 & R4^2 & R4^3 \\ 0 & 1 & 2R3 & 3R3^2 \\ 0 & 1 & 2R4 & 3R4^2 \end{bmatrix} \begin{bmatrix} a \\ b \\ c \\ d \end{bmatrix} = \begin{bmatrix} X3 \\ X4 \\ dXdR3 \\ dXdR4 \end{bmatrix}$$

$$x = a + br + cr^2 + dr^3$$

$$\begin{bmatrix} 1 & R1 & R1^2 & R1^3 \\ 1 & R2 & R2^2 & R2^3 \\ 0 & 1 & 2R1 & 3R1^2 \\ 0 & 1 & 2R2 & 3R2^2 \end{bmatrix} \begin{bmatrix} a \\ b \\ c \\ d \end{bmatrix} = \begin{bmatrix} X1 \\ X2 \\ dXdR1 \\ dXdR2 \end{bmatrix}$$

FIG. 12

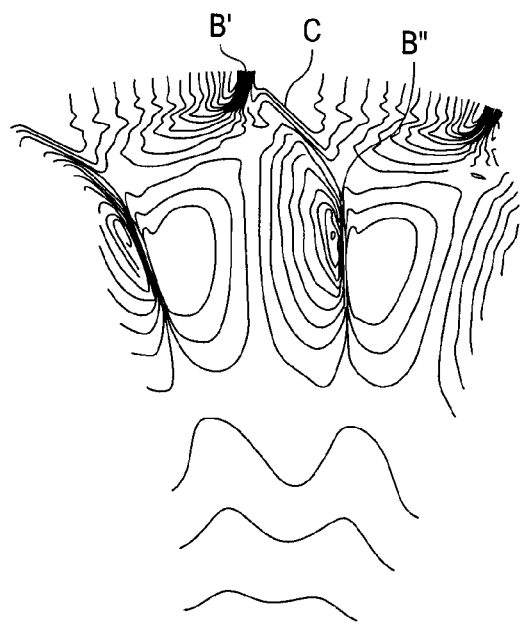
FIG. 18
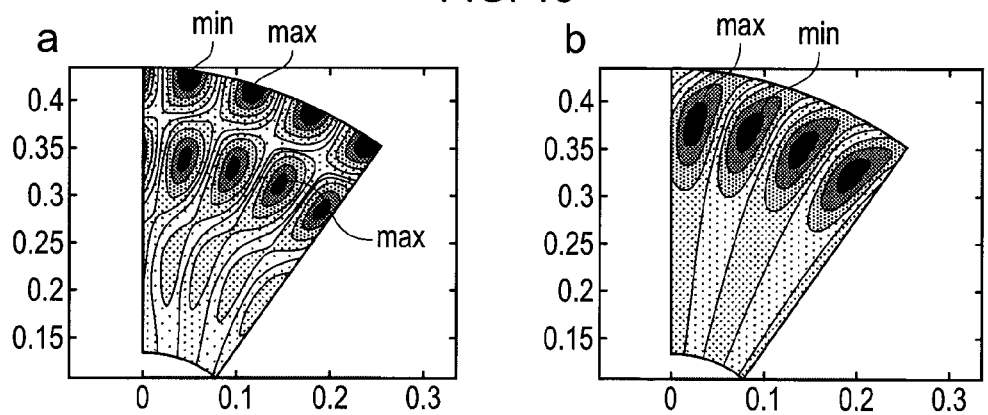
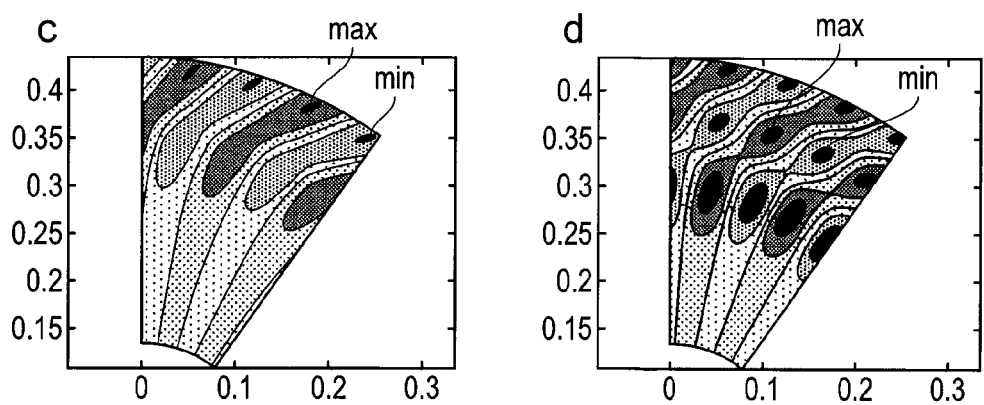
FIG. 19

TONE NOISE REDUCTION IN TURBOMACHINES

FIELD OF THE INVENTION

The present invention relates to blades for a turbomachine, turbomachines including a casing and a cascade of circumferentially spaced blades, and methods of designing and producing blades. In particular, although not exclusively, the blades may be fan blades and the turbomachines may be aero gas turbine engines.

BACKGROUND OF THE INVENTION

The significance of acoustics in the design of aero gas turbine engines has increased in recent years as a consequence of stringent requirements imposed by regulatory authorities on the noise radiated during particularly the take-off and approach phases of flight.

The noise produced by an aero gas turbine engine is the accumulation of many individual noise sources. Sources related to the turbomachinery (fan, turbine, compressor) contain both broadband and tonal components, while the jet noise source is broadband in nature.

The fan is typically a major source of tone noise emanating from the inlet, particularly when the engine is at an operating condition which generates supersonic fluid flow at the fan blades. In this case, tone noise is produced by shock waves emanating from the fan blades and propagating upstream through the engine intake.

Such tone noise typically has components at the fan blade passing frequency (BPF) and at frequency multiples thereof. The noise can also include "buzz" caused by variations in the shock waves produced by adjacent fan blades. The variations themselves can be caused, for example, by small differences in manufactured fan blade shapes. Buzz occurs at harmonics of shaft rotation frequency. Although buzz can be the predominant part of the tone noise produced by a fan, it is effectively a distortion of the BPF tone and its harmonics. Therefore, if the BPF tone and its harmonics are attenuated close to the source, buzz should also be attenuated.

An important way of reducing noise levels is to line the intake and bypass ducts with panels that absorb the sound produced by the fan system.

It has also been suggested to counteract the tone noise produced by a fan by matching the fan blades with axially spaced stator vanes. For example, U.S. Pat. No. 5,169,288 proposes a fan assembly in which the number of stator blades is selected to obtain equal values of a cut-off ratio for at least two BPF harmonics.

J. M. Tyler and T. G. Sofrin, "Axial Flow Compressor Noise Studies", SAE Transactions, Vol. 70, 1962, pp. 309-332 provides a "spinning mode theory" which has been applied by other workers to understand and combat tone noise produced by aero gas turbine engines.

D. Prasad and J. Feng, "Propagation and Decay of Shock Waves in Turbofan Engine Inlets", Proceedings of ASME Turbo Expo 2004, Jun. 14-17, 2004, Vienna, Austria describes numerical experiments carried out to investigate the tone noise radiated from a turbofan engine inlet at supersonic operating conditions. The experiments focused on the attenuation of acoustic power produced by changes to the shape of the engine nacelle.

Of course, the final design of aero engines, and particularly fan blades, is influenced by a number of factors, of which engine noise reduction may be but one. Thus, U.S. Pat. No. 6,071,077 describes a swept fan blade which aims to increase fan blade efficiency and resistance to foreign object damage. The blade has, among other characteristics, a leading edge of variable sweep angle which, with increasing radial distance, changes from forward swept to rearward swept to forward swept again. U.S. Pat. No. 6,358,003 describes another swept fan blade which aims to increase fan blade efficiency and flow stability. This blade has, in the tip region, a leading edge with forward-backward sweep.

DEFINITIONS

By an "operating condition" we mean a combination of the turbomachine rotational speed and working fluid mass flow rate at a specified inlet stagnation pressure and stagnation temperature that provides a given pressure ratio across a set of blades, which are typically the blades of a fan.

By "sweep angle" we mean the acute angle at any arbitrary radial position on the leading edge of a blade between a line tangent to the leading-edge at that position and a plane perpendicular to the working fluid relative velocity vector at that position. Thus the sweep angle at a particular position can change with operating condition, although for many blades which have normal supersonic operating conditions, the sweep angle at a position does not vary enormously over the range of such operating conditions. Precise measurement of sweep angle typically requires an analysis of the air flow at the blade leading edge. Techniques for doing this, such as computational fluid dynamics (CFD), are known to the skilled person.

By a "forward sweep angle" we mean a sweep angle where the radially outward extension of the line tangent to the leading edge lies on the upstream side of the plane perpendicular to the working fluid relative velocity vector. Conversely, by a "rearward sweep angle" we mean a sweep angle where the radially outward extension of the line tangent to the leading edge lies on the downstream side of the plane perpendicular to the working fluid relative velocity vector. Thus, "forward swept" and "rearward swept" portions of leading edge refer to leading edge portions consisting of respectively forward and rearward sweep angles. Although a skilled person may be able to tell by visual inspection whether portions of a leading edge are forward or rearward swept at particular operating conditions, this becomes progressively more difficult towards the tip of a blade where working fluid relative velocity vectors are higher and blade stagger angles can be large. It may then be necessary to recourse, for example, to CFD analysis. In what follows we differentiate forward and rearward sweep angles by a sign convention, forward sweep angles being negative and rearward sweep angles being positive.

By a "turning point" we mean a local maximum or minimum in a quantity. Thus, at a turning point, the gradient of the quantity is zero. From a position at the turning point, the quantity either increases in both directions (for a local minimum) or decreases in both directions (for a local maximum).

By "tone noise" we mean noise at the blade passing frequency (BPF) and/or at one or more frequency multiples thereof. As such noise propagates, for example, from its origin at a cascade of blades of a turbomachine, along a casing and out of an inlet, buzz may come to dominate the tone noise. However, for the avoidance of doubt, even in circumstances where to a far field observer of a turbomachine having a cascade of blades the tone noise produced by the blades is inaudible over such buzz, the turbomachine is considered to produce tone noise. That is, it is irrelevant if a far field observer is not be able to hear the tone noise as long as that tone noise does in fact exist and could be measured, for example, by a microphone positioned in the turbomachine adjacent the blades.

SUMMARY OF THE INVENTION

The present invention is at least partly based on the inventors' insight that tone noise emanating from a turbomachine can be reduced by directing acoustic power into those acoustic modes which are better attenuated by the machine itself. A further insight of the inventors was that this can be achieved by careful control of the blade leading edge position with spanwise distance.

Thus in general terms, the present invention provides a blade for a turbomachine which is shaped to direct acoustic power into well-attenuated acoustic modes, and a corresponding blade design methodology.

However, before describing the invention in more detail, it is useful to give a brief overview of relevant acoustic theory.

FIG. 1a is a schematic cross-sectional view through adjacent fan blades 1 of an aero gas turbine engine, and shows a type of shock structure that can be produced by the blades at a supersonic operating condition. Oblique shocks 2 are formed near the leading edges. The oblique shock on the suction side of each blade propagates away from the blade row and spirals towards the engine inlet, while the oblique shock on the pressure side of the blade lies inside the interblade passage and merges with a normal shock 3 formed on the suction surface of the adjacent blade. At other operating conditions, however, different shock structures are possible. For instance, at some conditions there will be a single shock positioned upstream of the leading edge of each blade. At other conditions two distinct shocks will be present, one upstream of the leading edge of each blade and another in each blade passage.

FIG. 1b shows schematically the static pressure along the dashed line A-A in FIG. 1a. The static pressure varies in time at a frequency which matches the BPF, giving rise to tone noise at the BPF and harmonics thereof.

Now, in a typical aero gas turbine engine, the inlet air passageway is bounded on the outside by a casing and on the inside by a hub or spinner. This arrangement approximates to an annular passageway bounded by two concentric cylinders.

For an annular passageway (shown schematically in FIG. 2a) having a negligibly small annular gap 4a, an input periodic pressure distribution p(s,t) (where s is circumferential distance around the annulus, and t is time), which fluctuates at a driving frequency f (i.e. the BPF), can be resolved into a linear sum of simple fourier modes $p_m(s, t)$ For example, $$p_m(s, t) = a_m \cos\left(\frac{2\pi}{\lambda_s}s - \omega t + \phi_m\right),$$

where $\lambda_s = 2\pi r_0/m$ ($r_0$ being the radius of the annulus, and m being the number of "lobes" or maxima of the respective cosine function on a complete $2\pi$ revolution), $\omega = 2\pi f$, and $a_m$ and $\phi_m$ are amplitude and phase coefficients.

Substitution provides the useful representation:

$$p_m(\theta, t) = a_m \cos [m(\theta - \Omega_m t) + \phi_m],$$

where $\theta = s/r_0$ and $\Omega_m = 2\pi f/m$.

The characteristic cosine functional form conforms with the requirement that at both ends of an arc of length $2\pi r_0$, the pressure and pressure gradient are the same. It will prove convenient later to recast the linear sum in terms of complex numbers:

$$p(\theta, t) = \sum_m p_m(\theta, t) = \text{Re}\left(\sum_m a_m \exp[im(\theta - \Omega_m t)]\right)$$

where $a_m$ now represents a complex coefficient. Furthermore, if the mean (that is, time-average) flow is uniform around the circumference it can be shown that in order for the pressure field of a particular mode to be propagated in the passageway (i.e. in a direction perpendicular to the plane of the cross-section of FIG. 2a), the circumferential Mach number $M_s = \lambda_s f/c$, which relates the speed at which the pressure field sweeps around the annulus to the speed of sound in free space c, must be equal to or greater than a certain value, which in the case of zero mean flow is unity. The transition from a decaying to a propagating pressure field is called cut-on.

Turning then to the more complicated case of a passageway which has a wide annular gap 4b (see FIG. 2b), the radial variation of pressure must now be accounted for. If the duct is hardwalled (that is, no acoustic liners are present at the inner or outer wall), then the unsteady pressure perturbation can be written as a linear sum of Bessel-fourier harmonics:

$$p(r, \theta, t) = \text{Re}\left(\sum_m p_m(r)\exp[im(\theta - \Omega_m t)]\right), \text{ where}$$

$$p_m(r) = \sum_{\mu=0}^{\infty} a_{m\mu} p_{m\mu}(r)$$

In this equation $a_{m\mu}$ are complex coefficients and $p_{m\mu}(r)$ are linear combinations of Y and J-type Bessel functions of circumferential order m and radial order $\mu$ such that the gradient at inner and outer annulus walls is zero.

In the case of buzz each circumferential order m represents a particular frequency (m times shaft frequency), and for a given m the noise heard at that frequency by an observer is the sum of the contributions from each of the radial modes $\mu$.

If the mean flow is axial and uniform a similar property holds as in the thin annulus case, namely that each Bessel-fourier harmonic (or "mode") can only propagate along the duct if the angular velocity at which the disturbance sweeps around the annulus exceeds a certain value (the "cut-on" point). In this case the cut-on point is different for each radial and circumferential mode, and also varies with the amplitude of the mean flow. It can, however, be calculated using a well-known formula, as was recognised (for instance) by Tyler and Sofrin in the paper referenced above.

Note that for buzz tones, which are rotor-locked, the rate at which the disturbance sweeps around the annulus is identically the rotor speed. In terms of circumferential Mach number at the tip, the cut-on point can be less than or greater than unity depending on the mean flow and the circumferential and radial order.

FIG. 3 is a schematic longitudinal cross-section of a typical aero engine intake, and shows a fan blade 5, hub 6, spinner 7, inlet cowl 8, acoustic liner 9, air intake passage 10 and engine axis O-O. In cases such as this, where the duct walls are acoustically lined, and/or the mean flow is not uniform in the radial direction, it is nonetheless possible to describe acoustic propagation in terms of modes. These modes are still fourier harmonics circumferentially, but (at least in the case of radially non-uniform flow) their radial form is no longer a combination of Bessel functions and sometimes has to be determined numerically. FIG. 4 shows the radial pressure distribution for a particular mode in an annular hardwall duct with uniform axial mean flow, compared with an equivalent mode in a duct with the same mean flow but with the wall impedance set to match the effect of an acoustic liner.

Significantly, each mode can still be associated with an axial wavenumber that represents its attenuation rate along the duct. In the hardwall case, cut-on waves propagate without attenuation. In acoustically lined ducts the attenuation rate varies continuously with the rate at which the signal sweeps around the annulus, but shows a similar trend in that attenuation rates tend to decrease as signal speed increases.

It is recognised that rotor alone and buzz propagation in particular may not be completely described by the modal description outlined above. Real ducts are not necessarily axisymmetric. Mean flow is not necessarily uniform in the circumferential direction. More significantly the shocks forming the noise generally decay non-linearly through the inlet. However, a modal description can still characterise the noise content at a particular axial plane, particularly if upstream and downstream travelling modes are distinguished, as shown in the case of a hardwall duct by A. G. Wilson, 2001, A Method for Deriving Tone Noise Information from CFD Calculations on the Aeroengine Fan Stage, Paper MP-79-P-03-Wilson, presented at the RTO/AVT Meeting, Manchester UK, 8-11 Oct.

Because acoustic propagation of buzz and tone noise is a combination of acoustic liner attenuation together with non-linear decay it is expected that characterising the noise in terms of "lined modes" (defined as modes that match the wall impedance of the acoustic liner and are calculated using an axisymmetric approximation of the mean flow and duct geometry) will give an indication of the effectiveness of the acoustic liner in attenuating noise.

At least for cut-on modes, in constant radius hardwall annular or cylindrical ducts with uniform axial mean flow the radial modes for upstream propagation are independent in the sense that each can be associated with a given power level, and the total acoustic power is the sum of its constituents.

In the more general case of softwall or lined ducts, radial modes are not independent in this fashion, the total acoustic power at any axial plane including cross-products between different modal coefficients. However, the total pressure field can still be defined as a linear sum of the individual modes, and tracking the mode coefficients allows the whole field to be recalculated and thence the total acoustic power.

Hence it is natural to define an acoustic "power" for each radial mode, which corresponds to its coefficient and can be calculated as what the acoustic power would be if the pressure field of that mode were instantaneously placed in a constant radius hardwall duct with uniform mean flow. In what follows, by the acoustic "power" of a radial lined or "softwall" mode we mean the power calculated in this way. However, the total acoustic power of the flow is no longer exactly the sum of these constituent power values.

Thus a general aspect of the present invention involves changing the blade shape (and particularly the leading edge position) to reduce or minimise the acoustic content or power at the BPF or harmonic frequency thereof in the upstream-travelling radial (lined) mode with axial wavenumber showing it to be the least attenuated mode with upstream axial distance. However, it is also possible to calculate numerically noise propagation through lined ducts without a modal description, and another general aspect of the present invention uses this technique to define the blade shape.

Typically, the least attenuated lined mode is the one with the least radial variation, and is thus equivalent to the lowest radial order Bessel-fourier mode in the hardwall uniform axial flow case. Thus in what follows we refer to first, second etc. radial modes. Strictly speaking, however, these refer to the lined modes in order of attenuation rate, as defined by the axial wavenumber, starting with the least attenuated. FIG. 5 shows schematically rates of attenuation for different radial modes produced by a lined engine intake at the BPF.

Thus, a first aspect of the invention provides a blade for a turbomachine, the blade extending, in use, in a radial direction relative to the axis of the turbomachine, and the turbomachine having at least one operating condition which generates supersonic fluid flow at the blade, wherein the blade is adapted to provide, at the supersonic operating condition, a leading edge sweep angle which varies such that successive radial positions (i) to (iii) along the leading edge are at respective sweep angle turning points, position (i) being the radially inner and position (iii) the radially outer of the positions, and position (i) being at or radially outward of the 30% span position, where 0% span is the radially innermost point of the leading edge and 100% span is the radially outermost point of the leading edge.

Advantageously, a blade having a leading edge shaped to provide such sweep angle variation can reduce or minimise the acoustic content or power at the BPF or harmonic frequency thereof in the upstream-travelling radial (lined) mode with axial wavenumber showing it to be the least attenuated mode with upstream axial distance.

Preferably position (i) is at or radially outward of the 40% or 50% span position.

Preferably the turning points at positions (i) and (iii) are at rearward swept portions of leading edge.

Preferably the turning point at position (ii) is at a forward swept portion of leading edge.

The sweep angle at position (iii) may be at least 20° and is preferably at least 30°, 40° or 50°.

Preferably position (iii) is radially inward of the 100% span position.

Preferably position (iii) is on a portion of the leading edge which extends from 65% to 100% of the leading edge span, more preferably from 80% to 98% of the leading edge span, and yet more preferably from 90% to 98% or from 93% to 98%.

The blade may have a radially outermost portion of leading edge which is forward swept.

The blade may have one or more further sweep angle turning points at other positions on the leading edge.

The leading edge sweep angle may vary so as to provide at successive radially outward positions consecutive forward swept, rearward swept, forward swept, rearward swept, and forward swept portions. The radially innermost forward swept portion can commence at 0% span. Such an arrangement may improve the mechanical stability of the blade. The radially outermost forward swept portion can end at 100% span.

Preferably, the leading edge sweep angle varies smoothly (i.e. is continuous) over the entire span of the blade.

A second aspect of the invention provides a blade for a turbomachine, the blade extending, in use, in a radial direction relative to the axis of the turbomachine, and the turbomachine having at least one operating condition which generates supersonic fluid flow at the blade, wherein the blade is shaped such that, at the supersonic operating condition, it produces first and second pressure shocks in the working fluid, the shocks extending out to a plane which is normal to the axis of the turbomachine and which is upstream of the radially outermost point of the blade leading edge relative to the overall direction of fluid flow through the turbomachine, and the shocks being radially spaced at said plane.

Advantageously, a blade shaped to produces such pressure shocks can direct acoustic power into better attenuated acoustic modes.

Preferably, at said plane the first and second shocks are circumferentially spaced. For example, at said plane, and taking the axis of the turbomachine as the origin, the circumferential angle between the first and second shocks may be at least a quarter of the angle in the circumferential direction between the blade and a neighbouring blade in the turbomachine.

At said plane, the first and second shocks do not connect to each other, but they may be connected at said plane by a region of static pressure gradient which is less than that required to form a shock.

Preferably the first shock is formed by a portion of the leading edge which extends from 85% to 100% of the leading edge span, 0% span being the radially innermost point of the leading edge and 100% span being the radially outermost point of the leading edge. Preferably the second shock is formed by a portion of the leading edge which extends from 50% to 70% of the leading edge span.

The blade may be shaped such that, at the supersonic operating condition, it produces one or more further shocks which extend out to said plane and which are radially spaced thereat.

A third aspect of the invention provides a blade for a turbomachine, the blade extending, in use, in a radial direction relative to the axis of the turbomachine, and the turbomachine having at least one operating condition which generates supersonic fluid flow at the blade, wherein the blade is shaped such that, at the supersonic operating condition, it produces a pressure shock in the working fluid, the shock extending out to a plane which is normal to the axis of the turbomachine and which is upstream of the radially outermost point of the blade leading edge relative to the overall direction of fluid flow through the turbomachine, and the shock having first and second portions at said plane, which portions are radially spaced and circumferentially spaced such that, taking the axis of the turbomachine as the origin, the circumferential angle between the portions is at least a quarter of the angle in the circumferential direction between the blade and a neighbouring blade in the turbomachine.

The blade of the third aspect is related to the blade of the second aspect. However, instead of producing unconnected radially spaced first and second shocks at said plane, the blade of the third aspect produces a pressure shock at said plane having radially spaced first and second portions. That is, the first and second portions are connected at said plane by a further shock portion. But preferably the shock is weaker at the further shock portion than at the first and second shock portions.

Preferably the first shock portion is formed by a portion of the leading edge which extends from 85% to 100% of the leading edge span, 0% span being the radially innermost point of the leading edge and 100% span being the radially outermost point of the leading edge. Preferably the second shock portion is formed by a portion of the leading edge which extends from 50% to 70% of the leading edge span.

In relation to the blade of the second or third aspect, said plane may be spaced, in the axial direction of the turbomachine, from the radially outermost point of the leading edge by a distance which is at least 20% (but preferably less than 400%, 200%, 100% or 40%) of the axial chord of the blade at its tip. However said plane may be spaced, in the axial direction of the turbomachine, from the radially outermost point of the leading edge by a distance which is at least 40% (but preferably less than 400%, 200% or 100%) of the axial chord of the blade at its tip, or by a distance which is at least 100% (but preferably less than 400% or 200%) of the axial chord of the blade at its tip.

The blade of the first, second or third aspect may be a blade which, in use, rotates about the axis of the turbomachine such as a fan blade, e.g. for an aero gas turbine engine.

A fourth aspect of the invention provides a turbomachine having a blade (which will typically be one of a cascade of circumferentially spaced blades) according to the first, second or third aspect.

A fifth aspect of the invention provides a turbomachine including:
a casing; and
a cascade of circumferentially spaced blades located in the casing and rotatable about the axis of the turbomachine;
wherein:
the turbomachine has at least one operating condition which generates supersonic fluid flow at the blades such that tone noise is produced at the blade passing frequency of the operating condition or at a harmonic frequency thereof;
the casing has a set of radial modes with respective attenuation rates for the upstream propagation of the tone noise at said frequency along the casing; and
the blades are shaped so that, at said operating condition and at a plane which is normal to the axis of the turbomachine and which is upstream of the radially outermost point of the blade leading edge relative to the overall direction of fluid flow through the turbomachine, the acoustic power of the tone noise at said frequency in the least attenuated radial mode is more than 5 dB lower than the total acoustic power of the tone noise at said frequency in the set of radial modes.

Preferably, the acoustic power of the tone noise at said frequency in the least attenuated radial mode is more than 10 dB lower, and desirably more than 15 dB lower, than the total acoustic power of the tone noise at said frequency in the set of radial modes.

A sixth aspect of the invention provides a turbomachine including:
a casing; and
a cascade of circumferentially spaced blades located in the casing and rotatable about the axis of the turbomachine;
wherein:
the turbomachine has at least one operating condition which generates supersonic fluid flow at the blades;
the blades are shaped such that at the supersonic operating condition each blade produces first and second pressure shocks in the working fluid, the shocks extending out to and being radially spaced at a plane which is normal to the axis of the turbomachine and which is upstream of the radially outermost point of the blade leading edge relative to the overall direction of fluid flow through the turbomachine, and the shocks producing tone noise at the blade passing frequency of the operating condition or at a harmonic frequency thereof; and
the casing has a set of radial modes with respective attenuation rates for the upstream propagation of the tone noise at said frequency along the casing, each radial mode within the set having a radially varying amplitude;
wherein the maximum amplitude of the least attenuated radial mode is at a radial position between the shocks.

Preferably, at said plane the first and second shocks are circumferentially spaced. For example, at said plane, and taking the axis of the turbomachine as the origin, the circumferential angle between the first and second shocks is at least a quarter of the angle in the circumferential direction between neighbouring blades.

At said plane, the first and second shocks do not connect to each other, but they may be connected at said plane by a region of static pressure gradient which is less than that required to form a shock.

Preferably the first shock is formed by a portion of the leading edge which extends from 85% to 100% of the leading edge span, 0% span being the radially innermost point of the leading edge and 100% span being the radially outermost point of the leading edge. Preferably the second shock is formed by a portion of the leading edge which extends from 50% to 70% of the leading edge span.

Each blade may be shaped such that, at the supersonic operating condition, it produces one or more further shocks which extend out to said plane and which are radially spaced thereat.

A seventh aspect of the invention provides a turbomachine including:
 a casing; and
 a cascade of circumferentially spaced blades located in the casing and rotatable about the axis of the turbomachine;
 wherein:
 the turbomachine has at least one operating condition which generates supersonic fluid flow at the blades;
 wherein the blades are shaped such that, at the supersonic operating condition, each blade produces a pressure shock in the working fluid, the shock extending out to a plane which is normal to the axis of the turbomachine and which is upstream of the radially outermost point of the blade leading edge relative to the overall direction of fluid flow through the turbomachine, and the shock having first and second portions at said plane, which portions are radially spaced and circumferentially spaced such that, taking the axis of the turbomachine as the origin, the circumferential angle between the portions is at least a quarter of the angle in the circumferential direction between neighbouring blades, and the shock producing tone noise at the blade passing frequency of the operating condition or at a harmonic frequency thereof; and
 the casing has a set of radial modes with respective attenuation rates for the upstream propagation of the tone noise at said frequency along the casing, each radial mode within the set having a radially varying amplitude;
 wherein the maximum amplitude of the least attenuated radial mode is at a radial position between the shock portions.

The first and second shock portions may be connected at said plane by a further shock portion, the shock being weaker at the further shock portion than at the first and second shock portions.

Preferably the first shock portion is formed by a portion of the leading edge which extends from 85% to 100% of the leading edge span, 0% span being the radially innermost point of the leading edge and 100% span being the radially outermost point of the leading edge. Preferably the second shock portion is formed by a portion of the leading edge which extends from 50% to 70% of the leading edge span.

The following optional or preferred features relate to the turbomachine of the fifth, sixth or seventh aspect.

Preferably said frequency is the blade passing frequency.

Said plane may be spaced, in the axial direction of the turbomachine, from the radially outermost point of the leading edge by a distance which is at least 20% (but preferably less than 400%, 200%, 100% or 40%) of the axial chord of the blade at its tip. However said plane may be spaced, in the axial direction of the turbomachine, from the radially outermost point of the leading edge by a distance which is at least 40% (but preferably less than 400%, 200% or 100%) of the axial chord of the blade at its tip, or by a distance which is at least 100% (but preferably less than 400% or 200%) of the axial chord of the blade at its tip.

The casing may have an acoustic liner which covers an inner surface thereof and which extends upstream of the blades. Preferably the downstream end of the liner is at said plane. Typically the acoustic liner covers the inner surface of an inlet cowl of the casing.

The blades may be fan blades. The turbomachine may be an aero gas turbine engine.

An eighth aspect of the invention provides a method of designing a blade which, in use, is one of a cascade of circumferentially spaced blades located in the casing of a turbomachine, the blades being rotatable about the axis of the turbomachine, the casing having an acoustic liner which covers an inner surface thereof and which extends upstream of the blades, and the turbomachine having at least one operating condition which generates supersonic fluid flow at the blades;
 the method comprising the steps of:
 (a) determining the flow field produced at the operating condition in the casing upstream of the blade relative to the overall direction of fluid flow through the turbomachine;
 (b) from the flow field, calculating the level of noise exiting the casing caused by the supersonic fluid flow; and
 (c) adjusting the shape of the leading edge of the blade and repeating steps (a) and (b) to reduce the level of the noise.

Preferably step (c) is performed repeatedly.

In step (b) the calculation can be performed by direct numerical calculation of propagated noise, for example by computational fluid dynamics, computational aeroacoustics, or an approximate method.

However, preferably step (b) includes the sub-steps of:
 (b-i) decomposing the flow field into a set of radial modes with respective attenuation rates for the upstream propagation of tone noise at the blade passing frequency of the operating condition or at a harmonic frequency thereof; and
 (b-ii) using the radial modes to calculate the level of the tone noise at said frequency exiting the casing after being propagated upstream therealong. The method may further comprise the preliminary step of measuring the attenuation rates for the radial modes.

More preferably, in step (c) the shape of the leading edge is adjusted to direct, at the operating condition, more of the acoustic power of the tone noise at said frequency into better attenuated radial modes.

The adjusted shape of the leading edge can be such that, at said operating condition and at a plane which is normal to the axis of the turbomachine and which is upstream of the radially outermost point of the leading edge relative to the overall direction of fluid flow through the turbomachine, the acoustic power of the tone noise at said frequency in the least attenuated radial mode of said set is more than 5 dB lower than the total acoustic power of the tone noise at said frequency in said set of radial modes. Preferably the acoustic power of the tone noise at said frequency in the least attenuated radial mode is more than 10 dB lower, and desirably more than 15 dB lower, than the total acoustic power of the tone noise at said frequency in the set of radial modes. Said plane may be spaced, in the axial direction of the turbomachine, from the radially outermost point of the leading edge by a distance which is at least 20% (but preferably less than 400%, 200%, 100% or 40%) of the axial chord of the blade at its tip. However said plane may be spaced, in the axial direction of the turbomachine, from the radially outermost point of the leading edge by a distance which is at least 40% (but preferably less than 400%, 200% or 100%) of the axial chord of the blade at its tip, or by a distance which is at least 100% (but preferably less than 400% or 200%) of the axial chord of the blade at its tip.

In sub-step (b-i) the pressure field may be decomposed into a plurality of sets of radial modes for the upstream propagation of tone noise at the blade passing frequency of the operating condition and one or more harmonic frequencies thereof. Then, in sub-step (b-ii) the total level of tone noise across the blade passing frequency and the harmonic frequency or frequencies can be calculated; and in step (c) the total level of tone noise can be reduced.

In sub-step (b-ii) the radial modes may contribute to a cost function which represents the level of tone noise; and in step (c) the blade shape may be adjusted to reduce the value of the cost function. Preferably, in sub-step (b-ii) each radial mode has a weighting which determines the relative contribution of that radial mode to the cost function.

A ninth aspect of the invention provides a method of producing a blade comprising the steps of:
(i) designing a blade according to the method of the previous aspect; and
(ii) producing the blade thus-designed.

A further aspect of the invention provides a computer-based system for performing the method of any one of the eighth aspect.

A further aspect of the invention provides a computer program product carrying a program for performing the method of the eighth aspect.

A further aspect of the invention provides a computer program for performing the method of the eighth aspect.

BRIEF DESCRIPTION OF THE DRAWINGS

FIG. 1a is a schematic cross-sectional view through adjacent fan blades of an aero gas turbine engine, and FIG. 1b shows schematically the static pressure along the broken line A-A in FIG. 1a, FIG. 2a shows schematically a transverse cross-section through an annular passageway having a negligibly small annular gap, and FIG. 2b shows schematically a transverse cross-section through an annular passageway which no longer has a negligibly small annular gap, FIG. 11a shows a solid perspective view from the front of the redesigned blade of FIG. 10 after manual modification (resulting in the designation G578D4), and FIG. 11b shows a solid perspective view from the side of the G578D4 blade, the mesh blades overlaid on the solid blades being a different blade (designated GEOM2008) derived from a further datum blade (designated GEOM2000) but differing from the GEOM2000 datum blade in the same manner as the G578D4 blade differs from the CHK 000 datum blade, FIG. 12 shows the parametrisation used in an optimisation process of the leading edge of the GEOM2000 datum blade, FIG. 18 is a sector of a transverse plane through an engine intake and shows modeled contours of static pressure obtained from the CFD analysis of the GEOM2028 blade, FIG. 19a is the same sector of transverse plane as FIG. 18 and shows contours of constant pressure at the BPF (that is, when m is set to the number of fan blades) at a specific time t, and FIGS. 19b-d show contours of constant value on that sector of the plane for the three least attenuated radial modes under softwall conditions at the BPF.

DETAILED DESCRIPTION

The invention will now be described in detail with reference to examples and embodiments.

Figure 6:
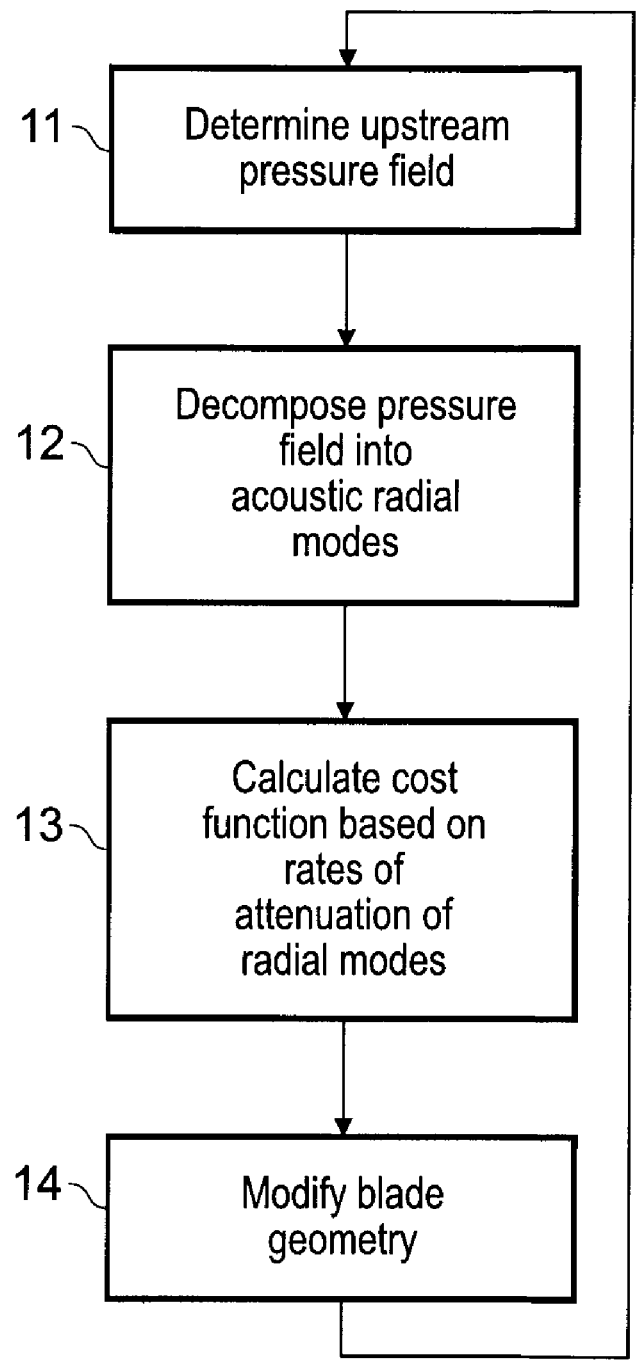
FIG. 6 is a flow chart showing stages in a fan blade design process.

FIG. 6 is a high level flow chart showing stages in a fan blade design process which has the aim of reducing fan tone noise at an operating condition which generates supersonic fluid flow at the blades.

A first stage 11 is the determination of the pressure field produced at the operating condition in the engine intake upstream of the blade relative to the overall direction of fluid flow through the turbomachine.

An initial task in this stage is, typically, to parametrise the blade geometry so that later it is possible to introduce variations to that geometry. For the purposes of fan tone noise optimisation, the shape of the fan blade leading edge is expected to be a dominant factor, so one approach is to vary the shape of the leading edge of the fan blade, while maintaining the trailing edge shape and the general aerodynamic design of the fan blade.

To assess the fan tone noise it is preferable to determine the pressure and velocity field resulting from the flow of air over the fan blade at an operating condition representative of a noise critical part of the aircraft operation, such as take-off. The calculation of the flow field can then be performed using computational Fluid Dynamics (CFD) techniques well known to the skilled person. The pressure field could be calculated, e.g. by CFD, for all or most of the intake (i.e. from inlet plane to fan), but this would consume large amounts of computing capacity. Thus a preferred approach is merely to calculate the pressure field up to a selected transverse plane forward (i.e. upstream) of the fan.

Next, at stage 12 in the fan blade design process, the pressure field is decomposed into a set of acoustic radial modes for the upstream propagation through the intake of tone noise. The radial modes are typically determined for the BPF or the first or second harmonic of the BPF, depending on which component the noise reduction process is focused. Alternatively, sets of acoustic modes can be determined for more than one frequency.

At stage 13, a cost function which quantifies the environmental impact of the tone noise when it exits the mouth of the intake is calculated. The cost function uses, for example, known or estimated rates of attenuation of each acoustic mode as it propagates through the intake. The attenuation rates will typically account for the effect of an acoustic liner. The cost function can also account for transitions between hardwall and softwall conditions at the liner ends, e.g. by matching hardwall modes to softwall modes and vice versa at these transitions.

The cost function may then be used, at stage 14, to drive an optimisation procedure which modifies the blade geometry. The modified geometry is then used to repeat stages 11, 12 and 13.

We now describe in more detail an actual example of such a design process in which fan rotors were first designed with design of experiment techniques followed by manual modification, and then with an automated optimisation method to minimise rotor alone tones.

A parametric blade and mesh generation tool, together with high fidelity CFD codes and tone noise extraction routines facilitated the design process. Such a complete system can convert a design vector into a fan blade geometry, calculate the tone noise generated and then produce a cost function to optimise. The tools, codes and routines for such a system are available to the skilled person. For example, in the actual design process we used PADRAM for blade and mesh generation and HYDRA CFD codes for pressure and velocity field calculation and tone noise extraction. PADRAM and HYDRA are discussed in S. Shahpar, and B. L. Lapworth, "PADRAM: Parametric Design and Rapid Meshing System for Turbomachinery Optimisation," ASME Paper GT-2003-38698, 2003.

Figures 7, 8:
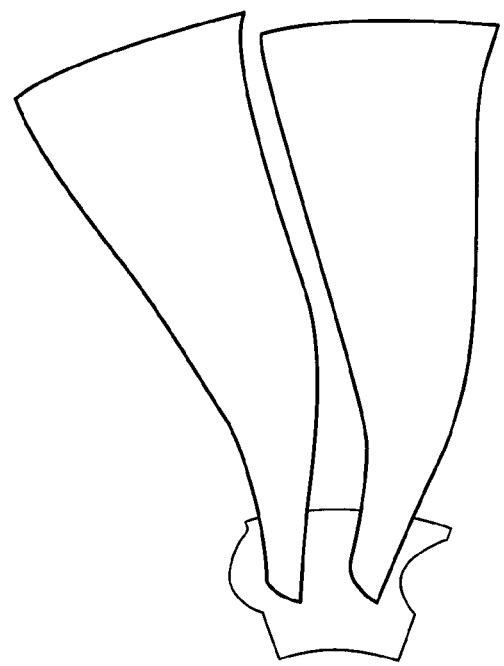
FIG. 7 is a perspective view of a datum blade (designated CHK 000)
FIG. 8 shows the parametrisation used in an optimisation process of the leading edge of the CHK 000 datum blade.

The datum blade (designated CHK 000) is shown in FIG. 7 and is representative of a modern model fan rig blade. Earlier studies had shown that blades with reasonably smooth trailing edges would be required to achieve satisfactory aerodynamic performance. The leading edge shape of the datum geometry was perturbed using (i) a cubic polynomial perturbation defining the leading edge between approximately 54% span and the radius of maximum deflection (RADM), and (ii) a quadratic polynomial defining the leading edge between the RADM and the tip at 100% span. The extent of the perturbation was specified by RADM and the linear slope (termed SWPM) between the 54% span blend point and RADM. The tip section was then specified by SWPT, defined as the linear slope between the RADM and the tip. Thus blade lean and sweep was defined by three parameters: RADM, SWPM and SWPT. The parametrisation is shown in FIG. 8.

Figure 3:
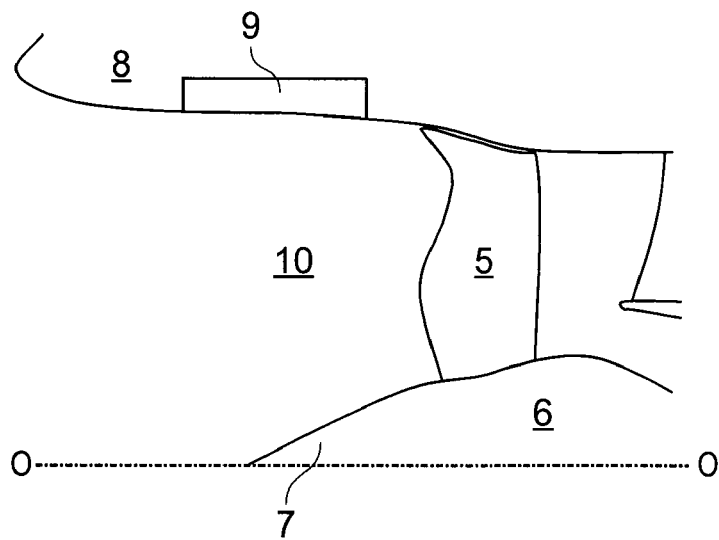
FIG. 3 shows schematically a longitudinal cross-section through a typical aero engine intake.
Figure 4:
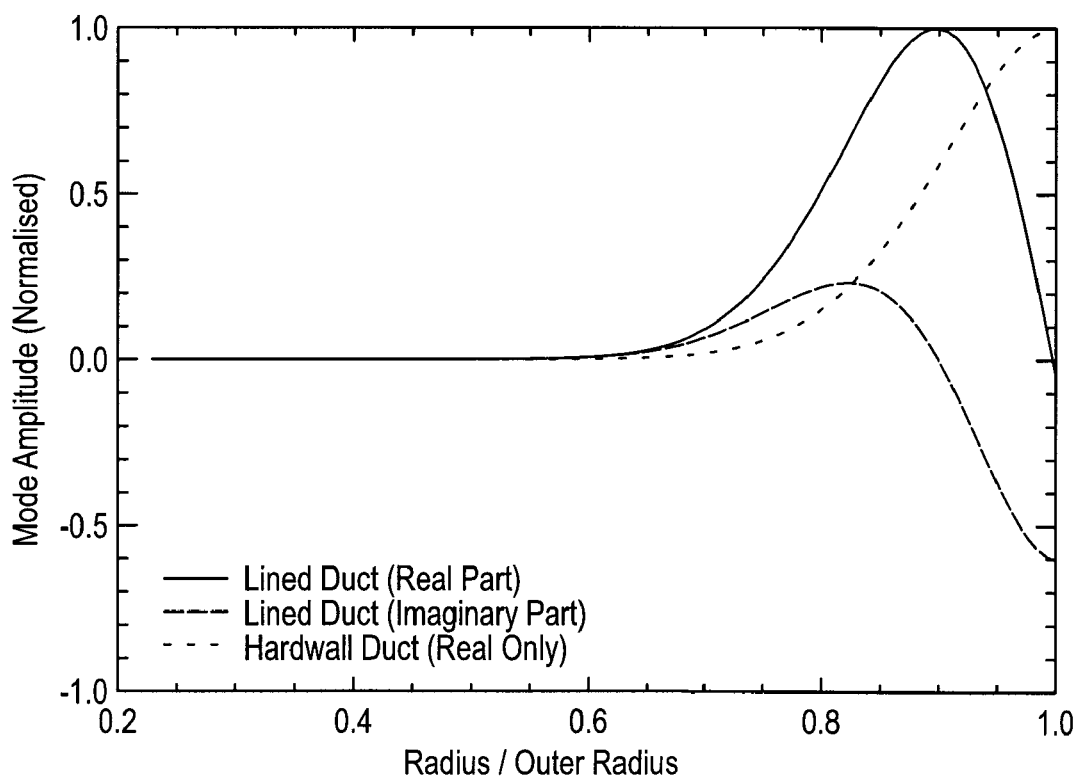
FIG. 4 is a graph showing the radial pressure distribution for a radial mode in an annular hardwall duct with uniform axial mean flow, and the equivalent mode with the same mean flow but with the wall impedance of the duct set to match the effect of an acoustic line.
Figure 9:
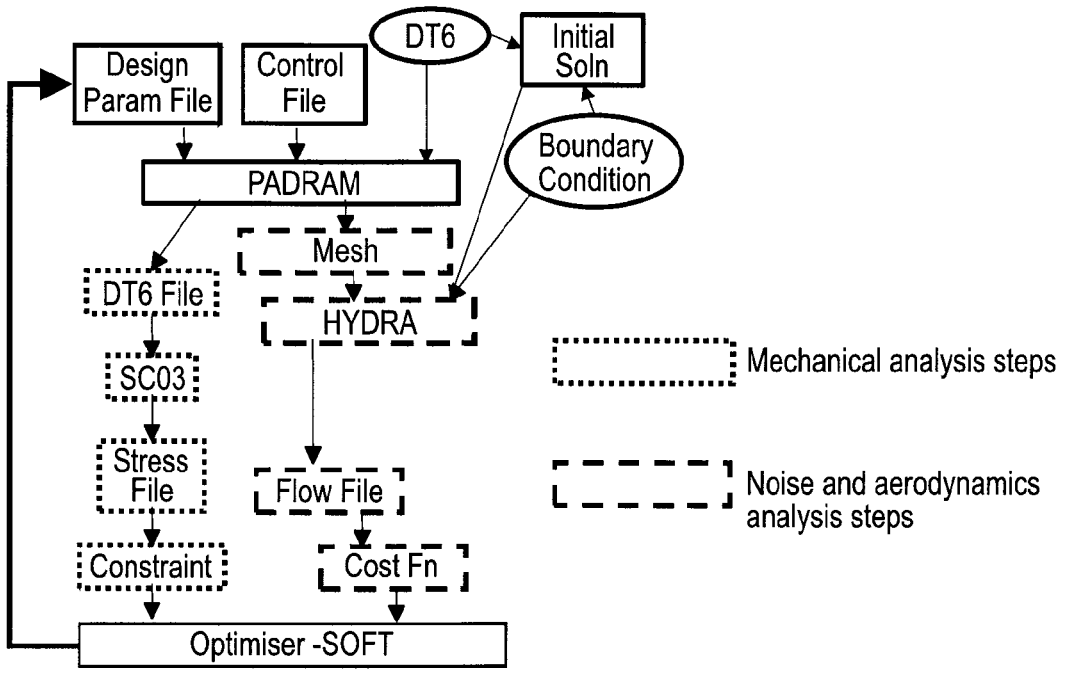
FIG. 9 is a flow chart showing schematically an optimisation process.

FIG. 9 shows schematically the design process employed. Starting from the datum blade design, parameterised changes to the blade leading edge shape were made as described above. A computational mesh was generated for the updated geometry. A high fidelity CFD calculation was then performed at an operating condition representative of the noise-critical take-off fly over point. The CFD solution was analysed to extract the fan tone noise at an axial plane representative of the location of the downstream end of the acoustic liner. The noise analysis involved decomposition of the CFD solution into the circumferential (fourier) and radial (Bessel-like) modes calculated for the real intake geometry. Both upstream travelling and downstream travelling modes were determined for an acoustically hardwalled intake. The upstream travelling hardwalled mode amplitudes were then matched to softwalled radial modes travelling upstream and hardwalled radial modes travelling downstream to simulate the junction between hardwalled and softwalled sections of the intake at the downstream end of an acoustic intake liner, such as liner 9 shown in FIG. 3. Each of the resulting upstream travelling softwalled modes was attenuated using an analytic model of the intake liner. The attenuated upstream travelling softwall mode amplitudes were then matched to upstream travelling hardwalled modes and downstream travelling softwalled modes to simulate the junction between lined and unlined duct at upstream end of the liner. Finally, the acoustic power in the upstream travelling hardwalled modes at the inlet was summed to give a cost function representing the total acoustic power radiated from the duct at the frequency of interest.

For the initial stages of the design process, the cost functions resulting from this procedure were calculated for a number of different parametrisations (i.e. leading edge shapes) and these cost functions were then used in design of experiment techniques to identify promising leading edge geometries.

Figure 10:
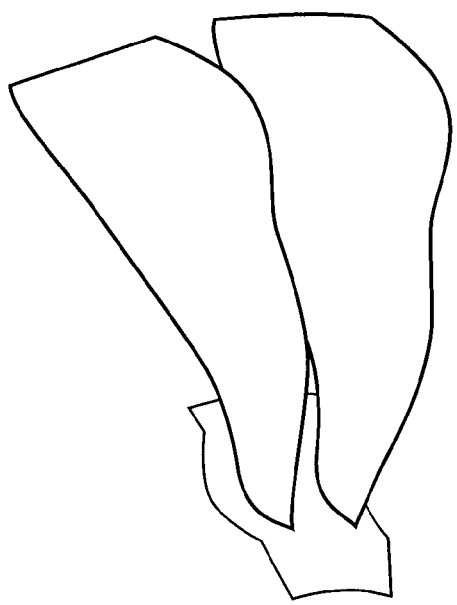
FIG. 10 is a perspective view of a redesigned blade based on the CHK 000 datum blade.

The blade shown in FIG. 10 resulted from the design process. Compared to the datum blade of FIG. 8 it has a significantly more curved leading edge. However the aerodynamic performance of this blade was inadequate and so some further manual modifications were made to:
  restagger the blade in the tip region to match the capture area ratio of the modified blade to that of the datum blade, and
  reduce the sweep in the tip to match that of the datum blade in order to delay stall.

The blade resulting from these modifications, designated G578D4, is shown in front and side views as the solid blade in FIGS. 11a and b. The G578D4 blade gave a noise cost function reduction of 17 dB relative to the datum blade of FIG. 7 at the noise-critical take-off operating condition.

Following on from the success of the above design, a second design was performed. A new datum blade, designated GEO2000 was selected and a new parameterisation was employed based on the experience of the previous design. The parametrised perturbation to the leading edge shape consisted of a (i) cubic polynomial perturbation defining the leading edge between approximately 54% span and the radius of maximum deflection (RADM), and (ii) a quadratic polynomial defining the leading edge between the RADM and RADT and (iii) a linear section between RADT and the tip at 100% span. The extent of the perturbation was specified by RADM and the linear slope (termed SWPM) between the 54% span blend point and RADM. The tip section was then specified by SWPT, defined as the linear slope between the RADM and RADT. Thus blade sweep was along the chord and was defined by four parameters: RADM, RADT, SWPM and SWPT. The parametrisation is shown in FIG. 12.

Figure 13:
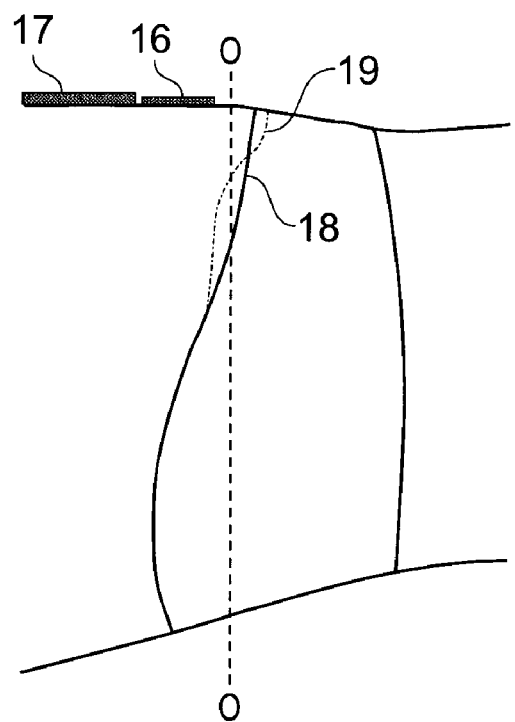
FIG. 13 shows schematically a longitudinal cross-section through a portion of the engine intake for the GEO2000 and GEO2008 blades.

The parameters representing the difference between G578D4 and the first datum blade CHK000 were applied to the new datum to produce a blade designated GEOM2008. The GEOM2008 blade, overlaid on the G578D4 blade, is shown in front and side views as the mesh blade in FIGS. 11a and b. FIG. 13 shows schematically a longitudinal cross-section through a portion of the engine intake for the GEO2000 and GEO2008 blades. The fan case liner 16 and intake liner 17 are upstream of the tips of the GEO2000 datum blade 18 and the GEO2008 redesigned blade 19.

Figure 14:
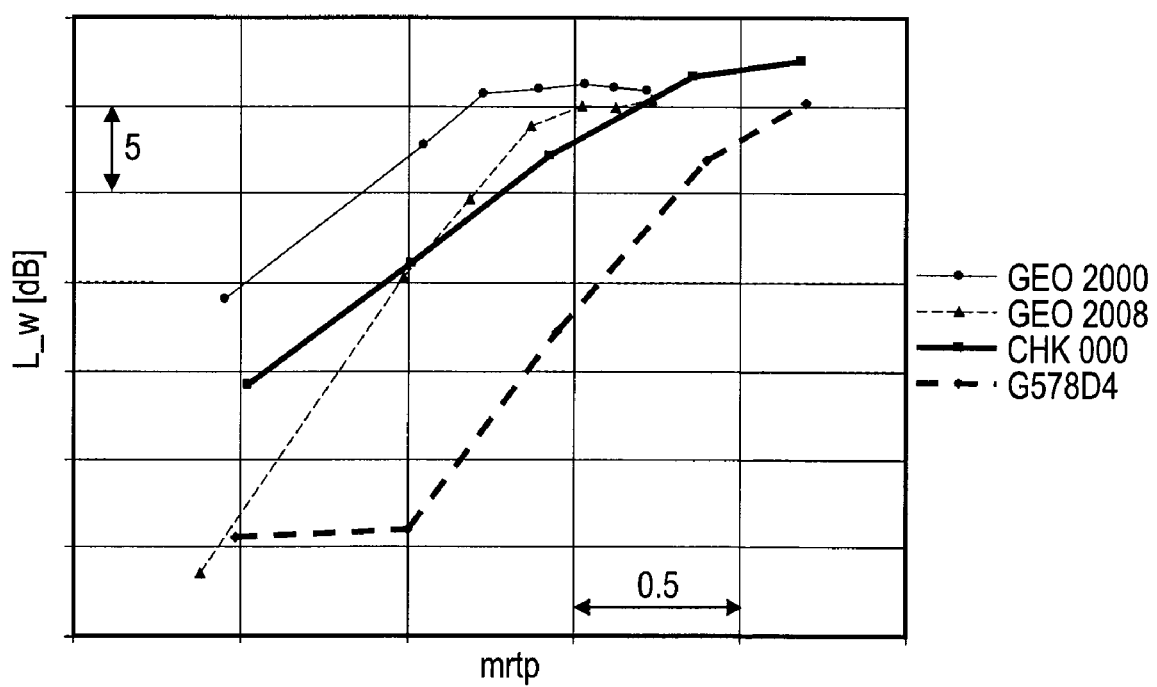
FIG. 14 is a graph showing the value of a noise cost function for datum blades CHK 000 and GEO2000 and their respective redesigned blades G578D4 and GEO2008 against non-dimensional mass flow.

FIG. 14 is a graph showing the value of the noise cost function employed in the design process against non-dimensional mass flow (mrtp) for the datum blades CHK 000 and GEO2000 and their respective redesigned blades G578D4 and GEO2008. The redesigned blades clearly provide substantial noise reduction benefits (as quantified by the noise cost function) over their respective datum blades.

Figure 15A:
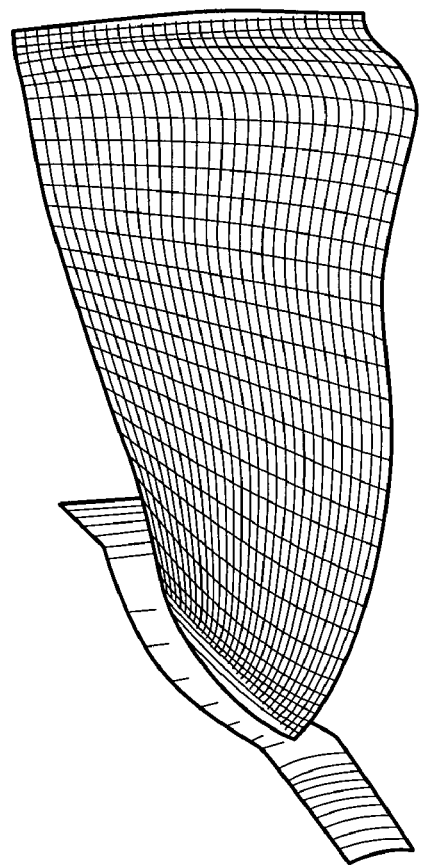
FIG. 15a is a perspective view of the suction side of the GEOM2028 blade with the leading edge at the right.
Figure 15B:
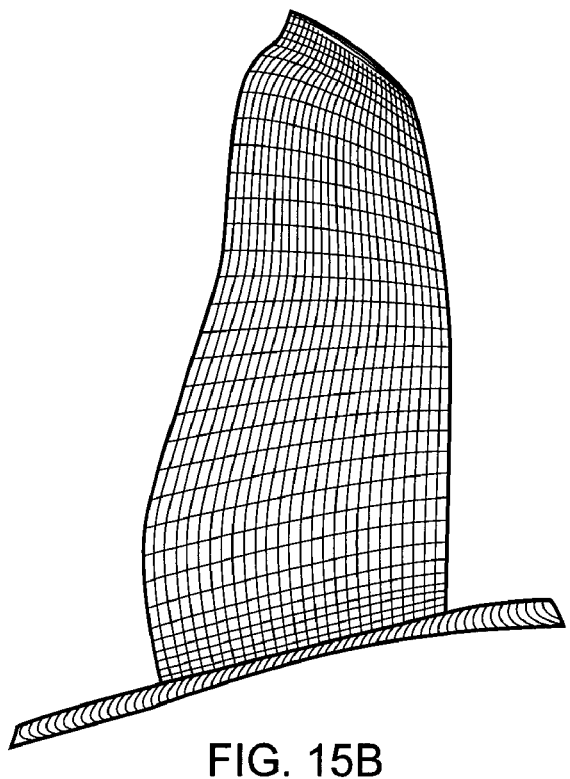
FIG. 15b is a perspective view of the pressure side of the GEOM2028 blade with the leading edge at the left.
Figure 15C:
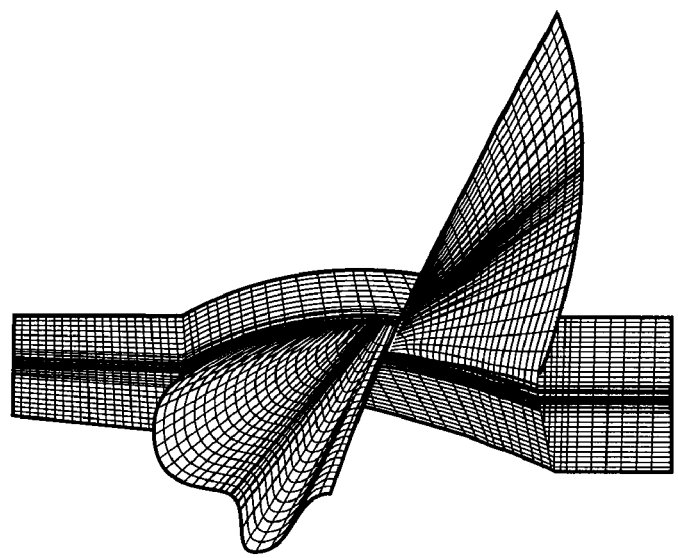
FIG. 15c is a top view of the GEOM2028 blade.
Figure 16:
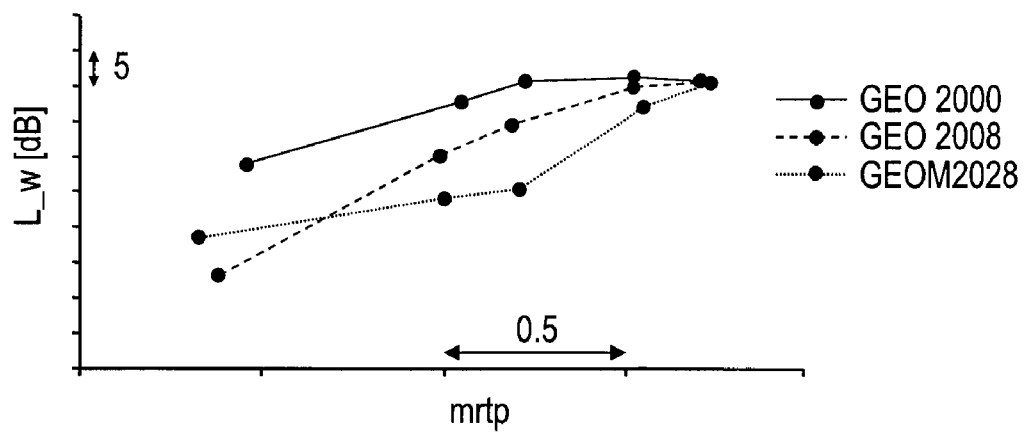
FIG. 16 is a graph showing the value of the noise cost function for datum blade GEO2000 and redesigned blades GEO2008 and GEOM2028 blades against non-dimensional mass flow.

Having verified the updated parametrisation, the GEO2008 blade was subjected to a further optimisation using a gradient based optimiser to change the leading edge shape parameters to minimise the noise cost function. The resulting blade, designated GEOM2028, had further improved noise characteristics relative to GEO2008, with a significant noise reduction at higher flow compared to the GEO2000 and GEO2008 blades. FIG. 15a is a perspective view of the suction side of the GEOM2028 blade with the leading edge at the right, FIG. 15b is a perspective view of the pressure side of the blade with the leading edge at the left, and FIG. 15c is a top view of the blade. FIG. 16 is a graph showing the value of the noise cost function against non-dimensional mass flow (mrtp) for the GEO2000, GEO2008 and GEOM2028 blades, highlighting that the noise reduction persists over a range of operating conditions.

Figure 17:
FIG. 17 is a sector of a transverse plane through an engine intake and shows modeled contours of static pressure obtained from the CFD analysis of the GEO2000 datum blade.

FIG. 17 is a sector of a transverse plane through the engine intake at the plane representative of the downstream end of the acoustic liner, and shows modeled contours of static pressure obtained from the CFD analysis of the GEO2000 datum blade. FIG. 18 is a corresponding sector on the same plane from the CFD analysis of the GEOM2028 blade. On FIG. 17, feature A is an oblique shock extending from the leading edge of the GEO2000 blade, while FIG. 18 shows two oblique shocks, B' and B", extending from the leading edge of the GEOM2028 blade. Thus, the redesign of the blade has produced a different shock structure in which, upstream of the fan, the single oblique shock generated by the GEO2000 blade is replaced by two radially and circumferentially spaced shocks generated by the GEOM2028 blade. These two shocks are distinct and are separated by a region of static pressure gradient, C, which is less than that required to form a shock. In other blade designs, region C might take the form of a relatively weak shock connecting stronger shocks B' and B".

Figure 5:
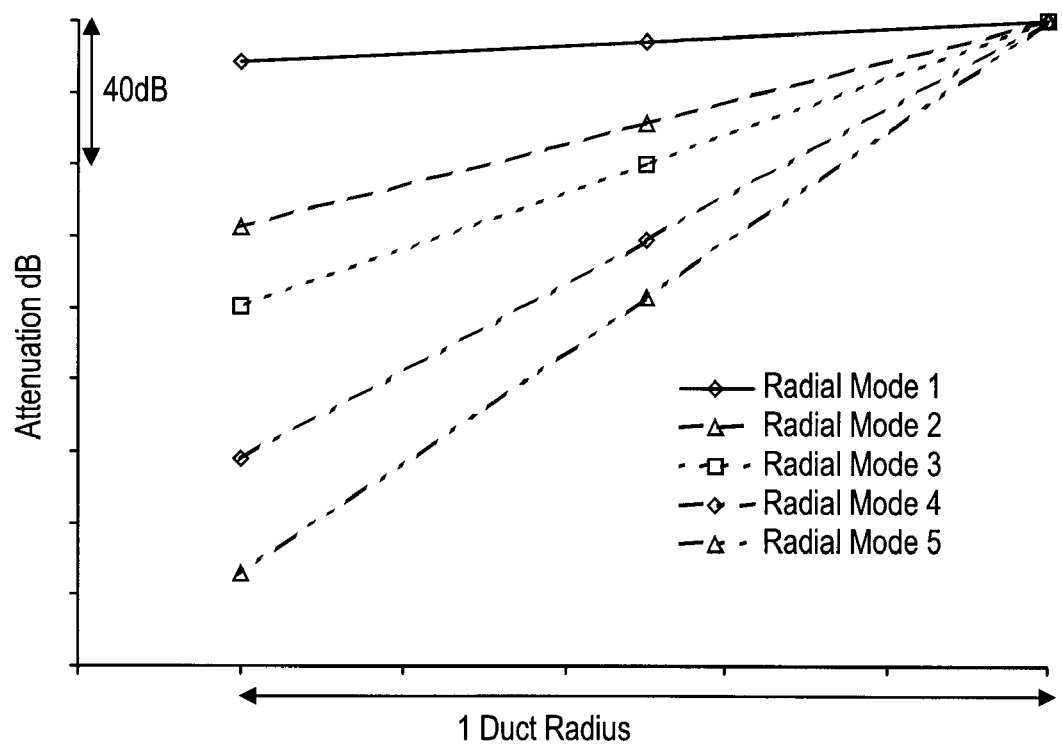
FIG. 5 shows schematically the rates of attenuation with increasing axial distance through a lined aero engine intake for different radial modes at the BPF.

The GEO2000 shock, being radially relatively uniform, couples well to the first acoustic radial mode at the BPF of the intake duct. Referring to FIG. 5, this mode is relatively poorly attenuated by the intake liner, and so leads to relatively high tone noise. In contrast, the GEOM2028 shocks are out of phase with the first (that is, the least attenuated) lined radial mode at the BPF, and direct more acoustic power into higher, better attenuated, radial modes. The result is an overall reduction in radiated tone noise.

This result can be understood with reference to FIGS. 19a-d. Recall that the upstream-travelling acoustic field at an axial plane can be resolved into a set of modes $$p(r, \theta, t) = \text{Re}\left(\sum_m p_m(r)\exp[im(\theta - \Omega_m t)]\right), \text{ where}$$

$$p_m(r) = \sum_{\mu=0}^{\infty} a_{m\mu} p_{m\mu}(r),$$

and that for rotor-locked tones each value of m represents a separate frequency. Using this decomposition it is possible to plot that part of the acoustic field which represents a particular frequency. This is done in FIG. 19a, which is the same sector of transverse plane as FIG. 18 and shows contours of constant pressure at the BPF (that is, when m is set to the number of fan blades) at a specific time t. FIGS. 19b-d then show contours of constant value for the three least attenuated radial modes $p_{m\mu}(r)$ under softwall conditions at the BPF. Maxima and minima are indicated in FIGS. 19a-d. What is clear is that FIG. 19a is significantly more mismatched with FIG. 19b, than with FIGS. 19c and d. As a consequence, more acoustic power at the BPF is directed into the more attenuated mode shown in FIG. 19c than into the least attenuated mode shown in FIG. 19b.

Figure 20:
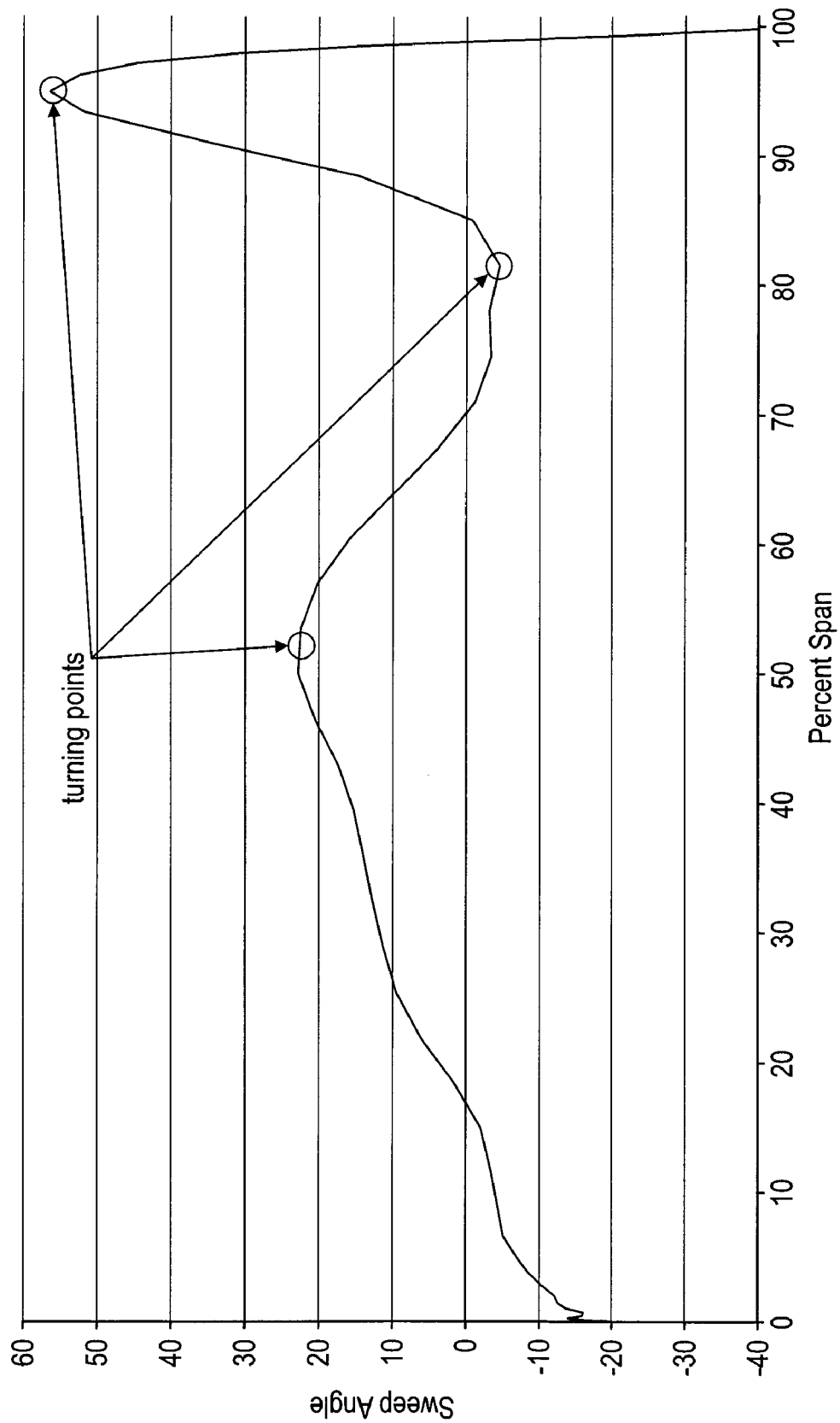
FIG. 20 is a graph of leading edge sweep angle plotted against radial distance from 0% span to 100% span for the GEOM2028 blade.

FIG. 20 is a graph of leading edge sweep angle plotted against radial distance from 0% span to 100% span for the GEOM2028 blade at the noise-critical take-off operating condition. The sweep angle variation, which along with the blade stagger produces the double shock structure of FIG. 18 and the pressure distribution of FIG. 19a, is characterised by three turning points at about 52%, 82% and 94% span. The overall shape of the leading edge is more complicated than the shapes of the leading edges of conventional blades. For example, from the radially innermost to the radially outermost position, the leading edge has successive forward-rearward-forward-rearward-forward swept portions. The leading edge also has a high rearward sweep angle of about 56° at the 95% span position, before becoming forwardly swept at the blade tip. In reality the leading edge sweep angle for GEOM2028 blade would vary smoothly over the entire span. The apparent discontinuities in FIG. 20 are modeling artifacts.

Figure 21:
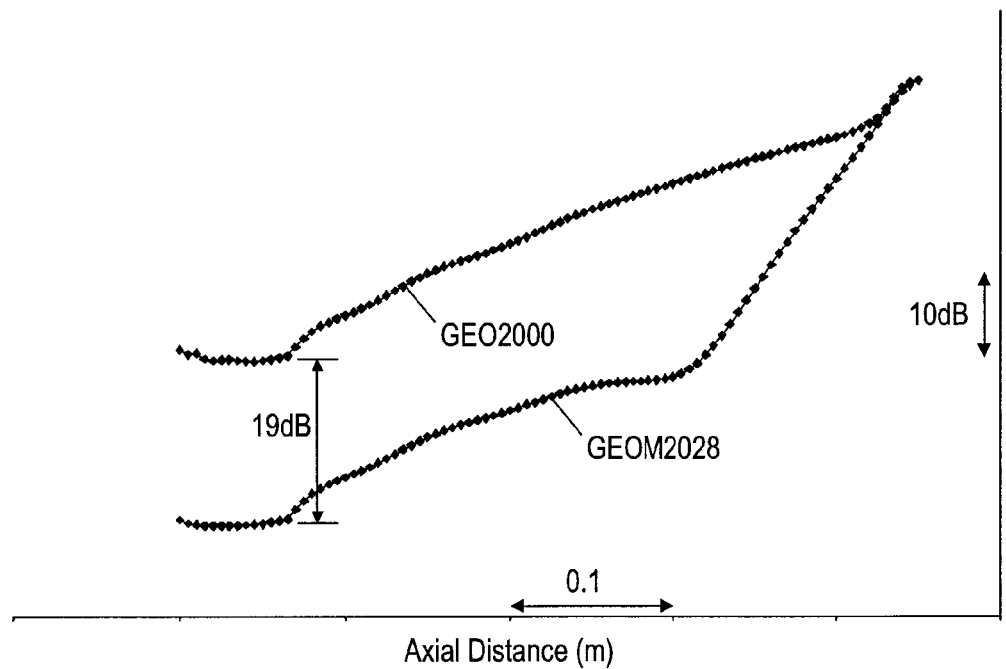
FIG. 21 is a graph of the predicted acoustic powers at the blade passing frequency predicted ahead of the GEOM2028 and the datum GEO2000 blades at the same operating point and with the same acoustic liner plotted against axial distance from the fan.

FIG. 21 is a graph of the acoustic powers at the BPF predicted ahead of the GEOM2028 and the datum GEO2000 blades at the same operating point and with the same acoustic liner plotted against axial distance from the fan. In this case the acoustic energies were calculated from a CFD analysis, including a soft-wall boundary condition to simulate the acoustic liner, to test the validity of the analytic liner model used in the blade design and optimise process. Close to the fan (at the right hand end of the graph) the acoustic power is similar for each blade. However, the modal content for the GEOM2028 blade is biased away from the first radial mode, which leads to a more effective attenuation of acoustic power by the liner and therefore less power remaining to be transmitted into the farfield.

Figure 22:
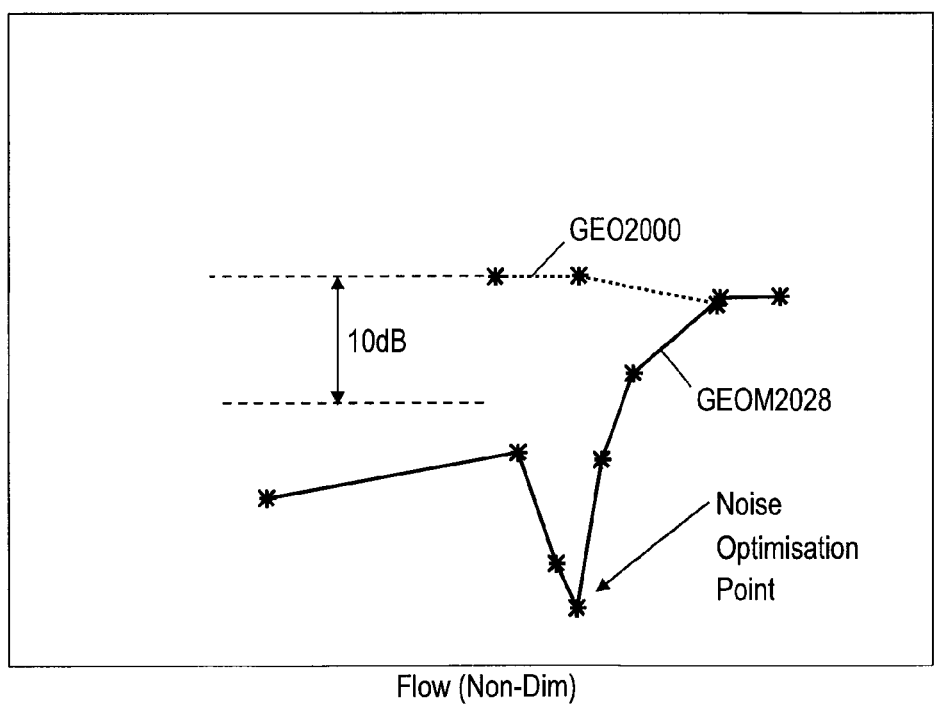
FIG. 22 is a graph of the predicted upstream radiated rotor alone tone noise at the blade passing frequency over a range of operating conditions for the GEOM2028 and the GEO2000 blades.

Indeed, FIG. 22 is a graph of the predicted upstream radiated rotor alone tone noise (in terms of sound power level PWL(dB)) at the BPF over a range of operating conditions (represented by differing back pressures) for the GEOM2028 and the GEO2000 blades. The greatest noise reduction is seen at the optimisation operating condition, but significant reductions are also obtained over a range of operating conditions.

The cost function used to attain the low radiated noise shown in FIG. 22 was based on three elements:
- a) a prediction of the acoustic power upstream of a typical acoustic liner in the intake duct as described above.
- b) an aerodynamic efficiency of the fan rotor predicted using a standard Computational Fluid Dynamics technique at a typical cruise operating point.
- c) an estimate of the steady stress related to any imbalance of the running blade due to modifications of the blade profile.

Different elements to a cost function can be combined in a number of ways according to recognised multi-objective optimisation methods. In this particular case an inner optimisation loop was performed to satisfy the requirements in terms of stress and aerodynamic performance, with an outer optimisation loop to obtain the optimal noise performance.

Possible variations to the design methodology described above include:
1. The upstream noise cost function could be calculated by numerical calculation without reference to modal amplitudes. This could be as part of a single numerical calculation comprising rotor source noise and propagation or as separate calculations for the bladed and unbladed regions. Various recognised methods for such calculations exist, including Computational Fluid Dynamics codes, finite element Euler Solvers, "dispersion-relation-preserving" schemes, potential methods and boundary element methods. These methods could be linear or non-linear, axisymmetric or (for a more accurate representation of realistic aeroengine intakes) fully three-dimensional.
2. The optimisation step could be performed using an adjoint method. This is an attested numerical technique for evaluating the effect of small geometric changes on a specific cost function.
3. The parameterisation of the blade leading edge could include lean as well as sweep (that is, the leading edge is free to move in any direction during the optimisation process).
4. The noise cost function to be minimised could be enhanced in one or more of the following ways:
   - a) More complex models of the intake liner attenuation characteristics may be used. They can include one or more areas of liner with fixed or varying impedance and possibly hardwall patches. In these cases noise will be produced in multiple circumferential harmonics. These can be minimised using a simple frequency-based weighting or more complex multiple objective optimisation methods.
   - b) The acoustic liner model can be replaced by experimentally-derived attenuation characteristics.
   - c) The acoustic attenuation and/or radiation properties of the intake itself can be modeled in addition to the intake liner. For instance a radiation model could be included, and the farfield noise minimised in the iterative step, perhaps weighted according to the radiation angle.
   - d) In non-aeroengine applications, a model of the upstream ducting can replace the intake liner model.
5. Fan blades can be designed to minimise higher harmonics of blade passing frequency, either separately or in conjunction with blade passing frequency, using essentially the same methodology as described above. The content in different frequencies can be minimised using a simple frequency-based weighting or more complex multiple objective optimisation methods in place of the simple optimisation process.
6. Fan blades can be designed to minimise harmonics of shaft frequency (that is "buzz-saw noise", also known as multiple pure tones), either separately or in conjunction with harmonics of blade passing frequency, using essentially the same method as described above but in which the numerical calculation includes the effect of geometrical non-uniformities between the blades. The content in different frequencies can be minimised using a simple frequency-based weighting or more complex multiple objective optimisation methods in place of the simple optimisation process.
7. The specific aerodynamic and mechanical constraints discussed in the detailed example above can be replaced by other constraints including other aerodynamic and mechanical constraints or weight, ease of manufacture or geometric constraints already known to the skilled person for designing conventional fan blades.
8. An extra step could be incorporated into the fan blade design process after stage 14 in FIG. 6. This step would entail modifying the blade profile downstream of the leading edge to achieve the required aerodynamic and/or mechanical performance with the given (modified) leading edge profile. This step can be achieved with standard blade design tools available to those in the industry and already used for blade designs without noise optimisation.
9. Fan blades can be designed using essentially the same method as described above, but minimising noise at more than one fan operating condition, using either a simple weighting method or more complex multiple objective optimisation methods.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All the references cited herein are incorporated by reference.

What is claimed is:

1. A blade for a turbomachine, the blade extending, in use, in a radial direction relative to the axis of the turbomachine, and the turbomachine having at least one operating condition which generates supersonic fluid flow at the blade,
wherein the blade is adapted to provide, at the supersonic operating condition, a leading edge sweep angle which varies such that successive radial positions (i) to (iii) along the leading edge are at respective sweep angle turning points, position (i) being the radially inner and position (iii) the radially outer of the positions, and position (i) being at or radially outward of the 30% span position, where 0% span is the radially innermost point of the leading edge and 100% span is the radially outermost point of the leading edge.

2. A blade according to claim 1, wherein position (i) is at or radially outward of the 40% or 50% span position.

3. A blade according to claim 1, wherein the turning points at positions (i) and (iii) are at rearward swept portions of leading edge.

4. A blade according to claim 1, wherein the turning point at position (ii) is at a forward swept portion of leading edge.

5. A blade according to claim 1, wherein the sweep angle at position (iii) is at least 20°.

6. A blade according to claim 1, wherein position (iii) is on a portion of the leading edge which extends from 65% to 100% of the leading edge span.

7. A blade according to claim 1 which has a radially outermost portion of leading edge which is forward swept.

8. A blade for a turbomachine, the blade extending, in use, in a radial direction relative to the axis of the turbomachine, and the turbomachine having at least one operating condition which generates supersonic fluid flow at the blade,
wherein the blade is shaped such that, at the supersonic operating condition, it produces first and second pressure shocks in the working fluid, the shocks extending out to a plane which is normal to the axis of the turbomachine and which is upstream of the radially outermost point of the blade leading edge relative to the overall direction of fluid flow through the turbomachine, and the shocks being radially spaced at said plane.

9. A blade according to claim 8, wherein at said plane the first and second shocks are circumferentially spaced.

10. A blade according to claim 9, wherein at said plane, and taking the axis of the turbomachine as the origin, the circumferential angle between the first and second shocks is at least a quarter of the angle in the circumferential direction between the blade and a neighbouring blade in the turbomachine.

11. A blade for a turbomachine, the blade extending, in use, in a radial direction relative to the axis of the turbomachine, and the turbomachine having at least one operating condition which generates supersonic fluid flow at the blade,
wherein the blade is shaped such that, at the supersonic operating condition, it produces a pressure shock in the working fluid, the shock extending out to a plane which is normal to the axis of the turbomachine and which is upstream of the radially outermost point of the blade leading edge relative to the overall direction of fluid flow through the turbomachine, and the shock having first and second portions at said plane, which portions are radially spaced and circumferentially spaced such that, taking the axis of the turbomachine as the origin, the circumferential angle between the portions is at least a quarter of the angle in the circumferential direction between the blade and a neighbouring blade in the turbomachine.

12. A blade according to claim 8 or 11, wherein said plane is spaced, in the axial direction of the turbomachine, from the radially outermost point of the leading edge by a distance which is at least 20% of the axial chord of the blade at its tip.

13. A blade according to claim 1, 8 or 11 which is a fan blade for an aero gas turbine engine.

14. A turbomachine having a blade according to claim 1, 8 or 11.

15. A turbomachine including:
a casing; and
a cascade of circumferentially spaced blades located in the casing and rotatable about the axis of the turbomachine;
wherein:
the turbomachine has at least one operating condition which generates supersonic fluid flow at the blades such that tone noise is produced at the blade passing frequency of the operating condition or at a harmonic frequency thereof;
the casing has a set of radial modes with respective attenuation rates for the upstream propagation of the tone noise at said frequency along the casing; and
the blades are shaped so that, at said operating condition and at a plane which is normal to the axis of the turbomachine and which is upstream of the radially outermost point of the blade leading edge relative to the overall direction of fluid flow through the turbomachine, the acoustic power of the tone noise at said frequency in the least attenuated radial mode is more than 5 dB lower than the total acoustic power of the tone noise at said frequency in the set of radial modes.

16. A turbomachine including:
a casing; and
a cascade of circumferentially spaced blades located in the casing and rotatable about the axis of the turbomachine;
wherein:
the turbomachine has at least one operating condition which generates supersonic fluid flow at the blades;
the blades are shaped such that at the supersonic operating condition each blade produces first and second pressure shocks in the working fluid, the shocks extending out to and being radially spaced at a plane which is normal to the axis of the turbomachine and which is upstream of the radially outermost point of the blade leading edge relative to the overall direction of fluid flow through the turbomachine, and the shocks producing tone noise at the blade passing frequency of the operating condition or at a harmonic frequency thereof; and
the casing has a set of radial modes with respective attenuation rates for the upstream propagation of the tone noise at said frequency along the casing, each radial mode within the set having a radially varying amplitude;
wherein the maximum amplitude of the least attenuated radial mode is at a radial position between the shocks.

17. A turbomachine according to claim 16, wherein at said plane the first and second shocks are circumferentially spaced.

18. A turbomachine according to claim 17, wherein at said plane, and taking the axis of the turbomachine as the origin, the circumferential angle between the first and second shocks is at least a quarter of the angle in the circumferential direction between neighbouring blades.

19. A turbomachine including:
a casing; and
a cascade of circumferentially spaced blades located in the casing and rotatable about the axis of the turbomachine;
wherein:
the turbomachine has at least one operating condition which generates supersonic fluid flow at the blades;
wherein the blades are shaped such that, at the supersonic operating condition, each blade produces a pressure shock in the working fluid, the shock extending out to a plane which is normal to the axis of the turbomachine and which is upstream of the radially outermost point of the blade leading edge relative to the overall direction of fluid flow through the turbomachine, and the shock having first and second portions at said plane, which portions are radially spaced and circumferentially spaced such that, taking the axis of the turbomachine as the origin, the circumferential angle between the portions is at least a quarter of the angle in the circumferential direction between neighbouring blades, and the shock producing tone noise at the blade passing frequency of the operating condition or at a harmonic frequency thereof; and
the casing has a set of radial modes with respective attenuation rates for the upstream propagation of the tone noise at said frequency along the casing, each radial mode within the set having a radially varying amplitude;
wherein the maximum amplitude of the least attenuated radial mode is at a radial position between the shock portions.

20. A turbomachine according to any one of claim 15, 16 or 19, wherein said plane is spaced, in the axial direction of the turbomachine, from the radially outermost points of the leading edges by a distance which is at least 20% of the axial chord of the blade at its tip.

21. A turbomachine according to any one of claim 15, 16 or 19, wherein the casing has an acoustic liner which covers an inner surface thereof and which extends upstream of the blades.

22. A turbomachine according to claim 21, wherein the downstream end of the liner is at said plane.

23. A turbomachine according to any one of claim 15, 16 or 19 which is an aero gas turbine engine.

24. A method of designing a blade which, in use, is one of a cascade of circumferentially spaced blades located in the casing of a turbomachine, the blades being rotatable about the axis of the turbomachine, the casing having an acoustic liner which covers an inner surface thereof and which extends upstream of the blades, and the turbomachine having at least one operating condition which generates supersonic fluid flow at the blades;

the method comprising the steps of:
(a) determining the flow field produced at the operating condition in the casing upstream of the blade relative to the overall direction of fluid flow through the turbomachine;
(b) from the flow field, calculating the level of noise exiting the casing caused by the supersonic fluid flow; and
(c) adjusting the shape of the leading edge of the blade and repeating steps (a) and (b) to reduce the level of the noise.

25. A method according to claim 24, wherein step (c) is performed repeatedly.

26. A method according to claim 24, wherein step (b) includes the sub-steps of:
(b-i) decomposing the flow field into a set of radial modes with respective attenuation rates for the upstream propagation of tone noise at the blade passing frequency of the operating condition or at a harmonic frequency thereof; and
(b-ii) using the radial modes to calculate the level of the tone noise at said frequency exiting the casing after being propagated upstream therealong.

27. A method according to claim 26, wherein:
in step (c) the shape of the leading edge is adjusted to direct, at the operating condition, more of the acoustic power of the tone noise at said frequency into better attenuated radial modes.

28. A method according to claim 26 wherein the adjusted shape of the leading edge is such that, at said operating condition and at a plane which is normal to the axis of the turbomachine and which is upstream of the radially outermost point of the leading edge relative to the overall direction of fluid flow through the turbomachine, the acoustic power of the tone noise at said frequency in the least attenuated radial mode of said set is more than 5 dB lower than the total acoustic power of the tone noise at said frequency in said set of radial modes.

29. A method according to claim 26, wherein:
in sub-step (b-ii) the radial modes contribute to a cost function which represents the level of tone noise; and
in step (c) the blade shape is adjusted to reduce the value of the cost function.

30. A method according to claim 29, wherein:
in sub-step (b-ii) each radial, mode has a weighting which determines the relative contribution of that radial mode to the cost function.

31. A method according to claim 26 further comprising the preliminary step of measuring the attenuation rates for the radial modes.

32. A method of producing a blade comprising the steps of:
(i) designing a blade according to the method of claim 24; and
(ii) producing the blade thus-designed.

33. A computer-based system adapted to perform the method of claim 24.

34. A computer program product carrying a program for performing the method of claim 24.

\* \* \* \* \*